United States Patent [19]

Doyle

[11] 3,913,402
[45] Oct. 21, 1975

[54] THERMOMETER PACIFIER
[76] Inventor: Barbara J. Doyle, 1224 Euclid, Santa Monica, Calif. 90404
[22] Filed: Oct. 9, 1974
[21] Appl. No.: 513,219

Related U.S. Application Data
[63] Continuation-in-part of Ser. No. 503,366, Sept. 5, 1974, abandoned.

[52] U.S. Cl.............. 73/343 R; 73/374; 128/2 H; 128/360
[51] Int. Cl.² ............... G01K 1/08; A61J 17/00
[58] Field of Search.......... 73/343 R, 374; 128/2 H, 128/359, 360

[56] References Cited
UNITED STATES PATENTS

| | | | |
|---|---|---|---|
| 1,467,904 | 9/1923 | McOmish........................ | 128/360 |
| 2,844,031 | 7/1958 | Rosenthal ...................... | 73/343 R |
| 3,117,450 | 1/1964 | Hoy ............................... | 73/374 |
| 3,186,411 | 6/1965 | Skidmore........................ | 128/360 |
| 3,782,194 | 1/1974 | Brodie et al. .................. | 73/343 R |

FOREIGN PATENTS OR APPLICATIONS
227,569   1/1925   United Kingdom............... 73/343 R OTHER PUBLICATIONS
Disney, W. Donald Duck In Washington Post, June 13, 1951, page 14B.

Primary Examiner—S. Clement Swisher
Assistant Examiner—Frederick Shoon

[57] ABSTRACT

A thermometer is provided in combination with a pacifier structure for use in ascertaining the temperature of a child. The assembled structure includes the usual pacifier nibble surrounding the well of the thermometer. Means are provided for protecting the stem of the thermometer so that a child cannot break the glass envelope of the thermometer.

5 Claims, 3 Drawing Figures

3,913,402

THERMOMETER PACIFIER

This application is a continuation-in-part of my application Ser. No. 503,366, filed Sept. 5, 1974, now abandoned.

BACKGROUND OF THE INVENTION

Ascertaining the temperature of a child is a problem facing both parent and physician. The common practice is to use a mercury filled glass thermometer and place this in the child's mouth underneath the tongue. While this is a very simple diagnostic procedure, the proper positioning of the thermometer and its retention in place for an adequate period of time present a problem. In addition, there is a danger of breakage of the thermometer and the possible injection of highly poisonous mercury into the body. Various attempts have been made to provide a safe and effective temperature sensing device but the shortcomings of these are readily apparent when one considers the continued widespread use of the glass mercury thermometer by both physicians and the public.

SUMMARY OF THE INVENTION

In general it is the broad object of the present invention to provide a device which can be readily used without any discomfort in ascertaining the temperature of a child. This includes the use of a so-called pacifier as a basic support for the thermometer. The latter, however, is so provided in conjunction with the pacifier that the thermometer is protected against accidental breakage. Further, if breakage should occur, the thermometer well containing the mercury is contained so that accidental ingestion of the mercury cannot occur.

A further object of the present invention is to provide a means for ascertaining the temperature of a child in a natural and easy manner.

DESCRIPTION OF THE PREFERRED EMBODIMENT

Figure 1:
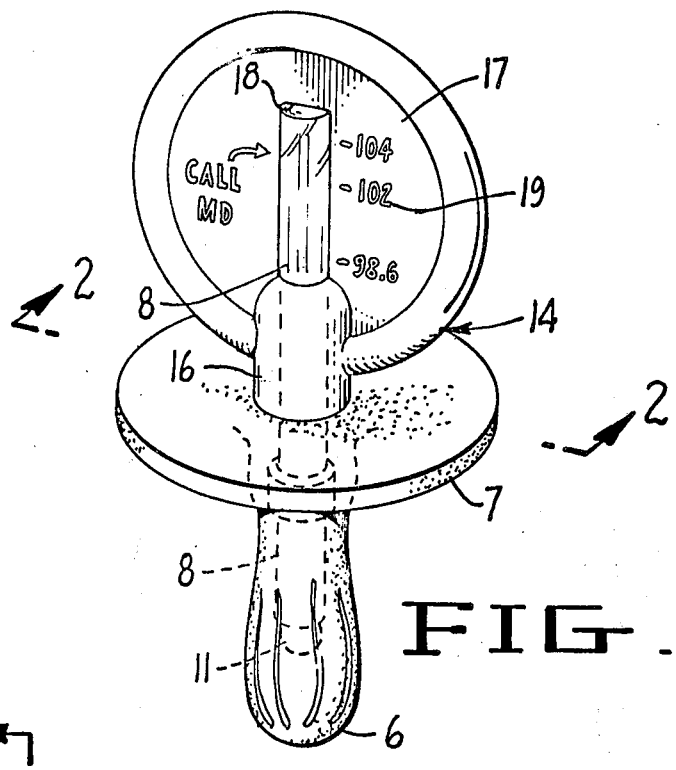
FIG. 1 is a perspective view of the assembled device.
Figure 2:
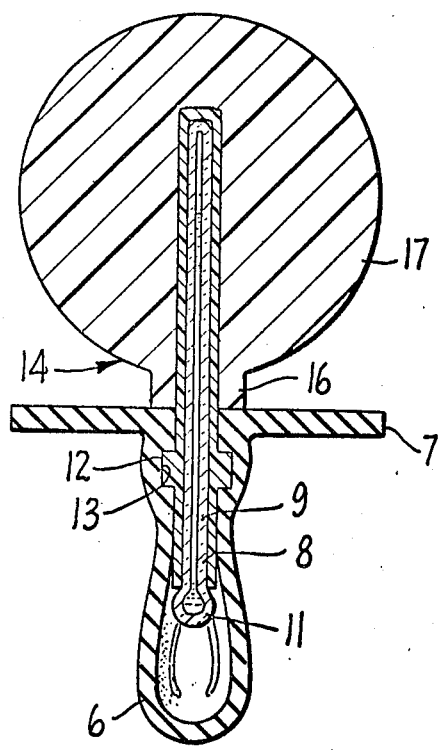
FIG. 2 is a section taken along the line 2—2 in FIG. 1.
Figure 3:
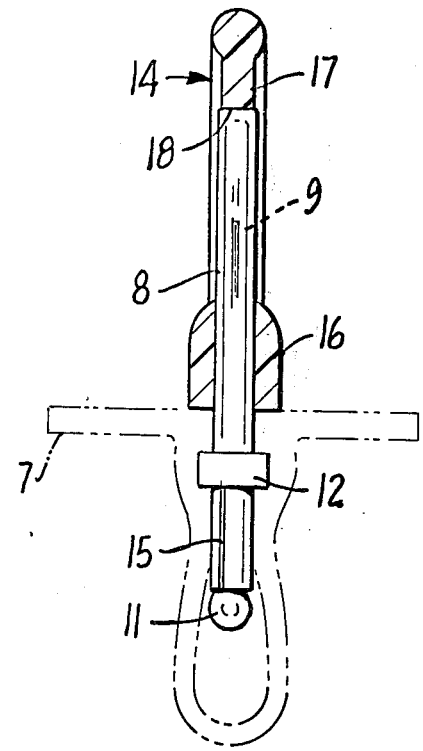
FIG. 3 is a section taken along the line 3—3 in FIG. 2.

In the preferred embodiment, the device includes a rubber nipple 6 of the size and shape usually associated with a child's pacifier. The nipple includes a circular stop flange 7 which restricts the passage of the device into the child's mouth. The nipple 6 and flange 7 are made in one piece and of a flexible material such as a high grade gum rubber. This integral structure can be readily removed from the engagement with the tube 8 and exterior shoulder 12 so that the nipple 6 and the flange 7 can be sterilized, since these are the portions of the device which ordinarily come into contact with the child's mouth. Interiorly of the pacifier is a transparent rigid tubular member 8 which surrounds the thermometer 9 and extends from slightly above the well 11 containing the mercury to the top of the thermometer. This tubular member 8 has an exterior shoulder 12 which fits in socket or recess 13 of nipple 6 and serves to hold the parts together and also presents a tooth engaging projection for the infant. Tubular member 8 also has a small slot 15 therein permitting some contraction of the tubular member. This contraction, however, is limited so that the tubular member cannot crush the thermometer. The tubular member 8 and enclosed thermometer 9 extend beyond the disc 7 and are encased in a rigid outer covering 14 formed by sleeve 16 and disc 17. The thermometer extends through the outer covering and into the rigid disc 17 which provides a support for the upper end of the thermometer. Disc 17 is formed with a port 18 for viewing the thermometer. One side of the disc is calibrated and includes temperature markings indicated at 19 as well as an indication to call the doctor if the mercury is between the upper and lower limits indicated by the temperatures 104°F. and 98.6°F. The disc is of such size that it cannot be made to enter a child's mouth while enabling the thermometer to be shaken to lower the mercury level in the glass tube of the thermometer.

From the foregoing, it will be seen that the present invention allows for easily taking the temperature of an infant in a structure which protects the child from the inherent dangers of a glass thermometer.

I claim:

1. A temperature sensitive device especially adapted for ascertaining a child's temperature comprising:
   a. a tubular member extending through the device and having a first end and a second end, said first end having a slot therein permitting limited compression of said first end,
   b. a clinical thermometer mounted in said tubular member and having a temperature responsive body therein adjacent to the said first end of the tubular member,
   c. a flexible nipple having an end thereof mounted on said tubular member and extending over said first end and providing an enclosure for said first end,
   d. a flexible disc mounted on said tubular member intermediate the ends thereof and adjacent to that end of the flexible member which is mounted on the tubular member,
   e. and a protective member mounted on the second end of the tubular member and providing a protective support for the clinical thermometer, said protective member having an opening therein for viewing the thermometer.

2. A device as in claim 1 wherein the protective member is a disc of a diameter such that it is too large to be received in a child's mouth.

3. A device as in claim 1 wherein the tubular member is formed of a rigid transparent material and encircles the stem of the thermometer.

4. A device as defined in claim 1 wherein the tubular member has a shoulder which is received in a socket of the nipple and provides therewith a tooth engaging projection for the teeth of the child.

5. A temperature indicating device for safely obtaining a visual indication of an infant's temperature, comprising: a flexible, hollow nipple having a circular stop flange on one end thereof of a size to prevent insertion of the flange into the infant's mouth, said hollow nipple having an annular recess therein adjacent said one end thereof; an elongate, hollow, rigid tube disposed coaxially within the nipple and having an open end and having an outwardly extending flange thereon between the ends thereof releasably received in said recess to retain the tube within the nipple, said open end of the tube disposed within the hollow interior of the nipple and the other end thereof extending a substantial distance beyond said one end of the nipple; a disc-shaped finger engaging handle carried by the tube and having opposite faces, with the plane of the handle perpendicular to the plane of the stop flange, said handle extending from said stop flange to beyond said other end of said tube; and a thermometer received coaxially within the tube and encased therein and having a mercury-containing well at one end thereof extending outwardly of and disposed immediately adjacent said open end of said tube within said hollow nipple, the other end of the thermometer extending within the tube and across a major portion of said handle and visible at least at one face of the handle, whereby the nipple may be placed in an infant's mouth and the temperature of the infant visually observed on said thermometer at said one face of the handle, said rigid tube protecting the thermometer against breakage, and the tube, thermometer and handle being separable from the nipple and stop flange whereby the nipple and stop flange may be sterilized.

* * * * *